US005434957A

United States Patent [19]

Moller

[11] Patent Number: 5,434,957

[45] Date of Patent: Jul. 18, 1995

[54] METHOD AND APPARATUS FOR GENERATING A COLOR PALETTE

[75] Inventor: Christian H. L. Moller, Austin, Tex.

[73] Assignee: International Business Machines Corporation, Armonk, N.Y.

[21] Appl. No.: 361,894

[22] Filed: Dec. 22, 1994

Related U.S. Application Data

[63] Continuation of Ser. No. 918,540, Jul. 22, 1992.

[51] Int. Cl.[6] ................ G06T 5/40

[52] U.S. Cl. ................ 395/131

[58] Field of Search ................ 395/131

[56] References Cited

U.S. PATENT DOCUMENTS

| | | | |
|---|---|---|---|
| 5,049,986 | 9/1991 | Aono et al. | 395/131 X |
| 5,228,126 | 7/1993 | Marianetti, II | 395/131 X |
| 5,241,658 | 8/1993 | Masterson et al. | 395/131 X |
| 5,249,263 | 9/1993 | Yanker | 395/131 |

FOREIGN PATENT DOCUMENTS

| | | |
|---|---|---|
| 0159691A3 | 10/1985 | European Pat. Off. . |
| 0366309A3 | 5/1990 | European Pat. Off. . |
| 02170192 | 6/1990 | Japan . |

OTHER PUBLICATIONS

IBM TDB, "Color Graphics Picture Segmentation" vol. 32, No. 3B, Aug. 1989, pp. 384–387.

Image Processing Algorithm and Techniques III, (1992), vol. 1657, "New Results In Color Image Quantization", R. Balasubramanian et al, Feb. 1992, pp. 289–303.

*Primary Examiner*—Mark K. Zimmerman
*Attorney, Agent, or Firm*—Paul S. Drake

[57] ABSTRACT

A method for generating a color palette from elements having multiple color component values including the steps of determining a color proximity of the elements by organizing the elements by a most significant bit of each element color component value followed by less significant bits of each element color component value, partitioning the organized elements into multiple groups by the color proximity, generating a color palette from the multiple groups, and displaying the generated color palette. In addition, an apparatus for generating a color palette from elements having multiple color component values including an apparatus for determining a color proximity of the elements by organizing the elements by a most significant bit of each element color component value followed by less significant bits of each element color component value, an apparatus for partitioning the organized elements into multiple groups by the color proximity, an apparatus for generating a color palette from the multiple groups, and a display for displaying the generated color palette.

20 Claims, 6 Drawing Sheets

| | R | G | B | # PIXELS | LUT INDEX |
|---|---|---|---|---|---|
| $A_1$ | 00000000 | 00000000 | 00000000 | 123 | 00000000 |
| $A_2$ | 10000011 | 10000000 | 10000000 | 12 | 00000001 |
| $A_{n-1}$ | 1111 1111 | 1111 1111 | 1010 0001 | 15 | n-1 |
| $A_n$ | 0011 1111 | 0011 1111 | 0111 1110 | 312 | n |

FIG. 4A

| $RGB_1$ | $RGB_2$ | ••• | $RGB_8$ | # PIXELS | ORIGINAL HISTOGRAM ADDRESS POINTERS |
|---|---|---|---|---|---|
| 000 | 000 | | 000 | 123 | $A_1$ |
| 111 | 000 | | 100 | 12 | $A_2$ |
| 111 | 111 | | 111 | 15 | $A_{n-1}$ |
| 000 | 001 | | 110 | 312 | $A_n$ |

FIG. 4B

| | $RGB_1$ | $RGB_2$ | ••• | $RGB_8$ | # PIXELS | ORIGINAL HISTOGRAM ADDRESS POINTERS |
|---|---|---|---|---|---|---|
| $B_0$ | 000 | 000 | | 000 | 123 | $A_1$ |
| $B_1$ | 000 | 001 | | 110 | 312 | $A_n$ |
| $B_{n-1}$ | 111 | 000 | | 100 | 12 | $A_2$ |
| $B_n$ | 111 | 111 | | 111 | 15 | $A_{n-1}$ |

FIG. 4C

| NODE DESCRIPTION | # ENTRIES | SORTED HISTOGRAM ADDRESS POINTER | NODE USED FLAG |
|---|---|---|---|
| 000 | 12 | $B_0$ | N |
| 001 | 56 | $B_A$ | N |
| 011 | 23 | $B_J$ | N |
| 100 | 32 | $B_K$ | N |
| 101 | 112 | $B_L$ | N |
| 110 | 201 | $B_M$ | N |
| 010 000 | 25 | $B_B$ | N |
| 010 001 | 36 | $B_C$ | N |
| 010 010 | 1 | $B_D$ | N |
| 010 011 | 56 | $B_E$ | N |
| 010 100 | 72 | $B_F$ | N |
| 010 101 | 111 | $B_G$ | N |
| 010 110 | 31 | $B_H$ | N |
| 010 111 | 26 | $B_I$ | N |

FIG. 7

METHOD AND APPARATUS FOR GENERATING A COLOR PALETTE

This is a continuation of application Ser. No. 07/918,540 filed Jul. 22, 1992.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to image information processing and more particularly to generating a color palette.

BACKGROUND ART

Many methods for displaying color information on display devices are known in the art. Most computer systems utilize RGB (red green blue) techniques wherein color information is processed as three separate digital units of color information for each displayed pixel. For example, in a typical 24 bit RGB computer system, 8 bits describe the intensity of a red color gun of a display, 8 bits describe the intensity of a green color gun of the display, and 8 bits describe the intensity of a blue color gun of the display for a total of over 16 million possible colors for each displayed pixel.

Due to the requirements of most computer displays, computer systems typically utilize a frame buffer to store the digital color information for each pixel. The frame buffer is then continuously scanned for displaying the pixel information on the display. In addition, the frame buffer is updated as needed by the computer system to modify the displayed information. However, for high resolution color systems, such as a display with 1280×1024 pixels and 24 bit color, a video look up table (LUT) is often utilized to lower the memory requirements for the frame buffer. When a LUT is utilized, the frame buffer stores indexes to the LUT rather than the actual displayed colors. The LUT stores a the actual pixel colors, called a color palette, at locations addressed by the indexes stored in the frame buffer. For example, the frame buffer may store an 8 bit index which is used to read a 256 entry LUT. The LUT then provides the 24 bit color for that index. Although this limits the total number of colors that can be displayed at any given time (256 colors in this example) this technique retains the total possible color palette of over 16 million colors.

There are several techniques for determining which colors will be stored in the video LUT. Some systems utilize a fixed LUT such that there are a small fixed number of colors that may be utilized. Some systems utilize a fixed LUT for a given application or set of images. Other dynamic systems allow a LUT to be generated for each image being displayed.

DISCLOSURE OF THE INVENTION

The present invention includes a method for generating a color palette from elements having multiple color component values including the steps of determining a color proximity of the elements by organizing the elements by a most significant bit of each element color component value followed by less significant bits of each element color component value, partitioning the organized elements into multiple groups by the color proximity, generating a color palette from the multiple groups, and displaying the generated color palette. In addition, the present invention includes an apparatus for generating a color palette from elements having multiple color component values including an apparatus for determining a color proximity of the elements by organizing the elements by a most significant bit of each element color component value followed by less significant bits of each element color component value, an apparatus for partitioning the organized elements into multiple groups by the color proximity, an apparatus for generating a color palette from the multiple groups, and a display for displaying the generated color palette.

A further understanding of the nature and advantages of the present invention may be realized by reference to the remaining portions of the specification and the drawings.

BRIEF DESCRIPTION OF THE DRAWING

FIGS. 4–C are histograms generated by the preferred method of FIG. 3;

FIG. 7 is a terminal node table that may be used by the preferred method of FIG. 5 to track the terminal nodes and their total number of entries and pixels.

BEST MODE FOR CARRYING OUT THE INVENTION

Figure 1:
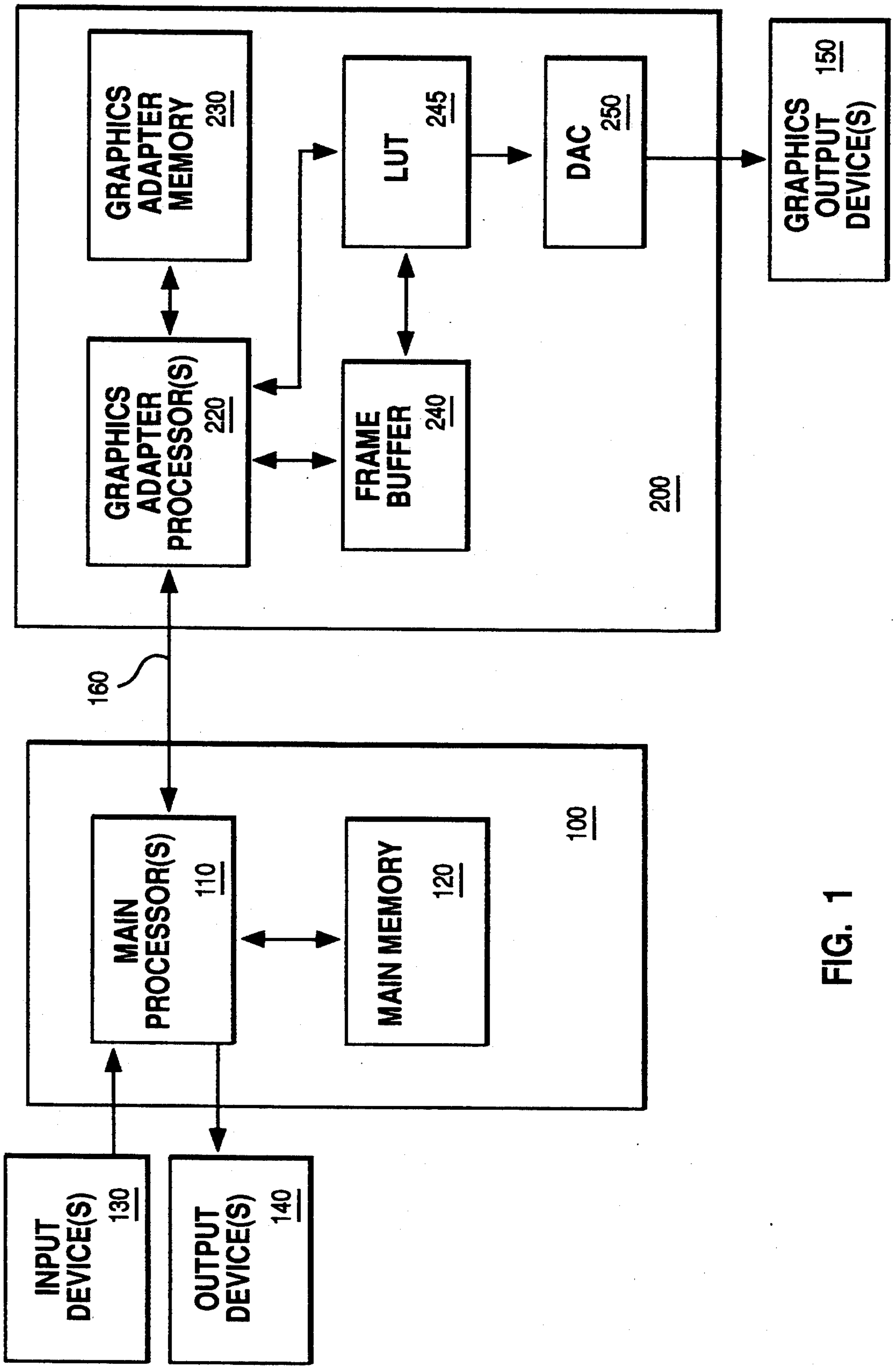
FIG. 1 is a block diagram of a typical digital computer utilized by a preferred embodiment of the invention.

FIG. 1 is a block diagram of a typical digital computer 100 utilized-by a preferred embodiment of the invention. The computer includes main processor(s) 110 coupled to a main memory 120, input device(s) 130 and output device(s) 140. Main processor(s) 110 may include a single processor or multiple processors. Input device(s) 130 may include a keyboard, mouse, tablet or other types of input devices. Output device(s) 140 may include a text monitor, plotter or other types of output devices. The main processor may also be coupled to graphics output device(s) 150 such as a graphics display through a graphics adapter 200. Graphics adapter 200 receives instructions regarding graphics from main processor 110 on bus 160. The graphics adapter then executes those instructions with graphics adapter processor(s) 220 coupled to a graphics adapter memory 230. The graphics processors in the graphics adapter then execute those instructions and updates frame buffer(s) 240 and video look up table (LUT) 245 based on those instructions. Graphic processor(s) 220 may also include specialized rendering hardware for rendering specific types of primitives to be rendered. Frame buffer(s) 240 includes an index value for every pixel to be displayed on the graphics output device. The index value read from the frame buffer is used to read LUT 245 for the actual color to be displayed,. A DAC (digital-to-analog converter) 250 converts the digital data stored in the LUT into RGB signals to be provided to the graphics display 150, thereby rendering the desired graphics output from the main processor.

Figure 2:
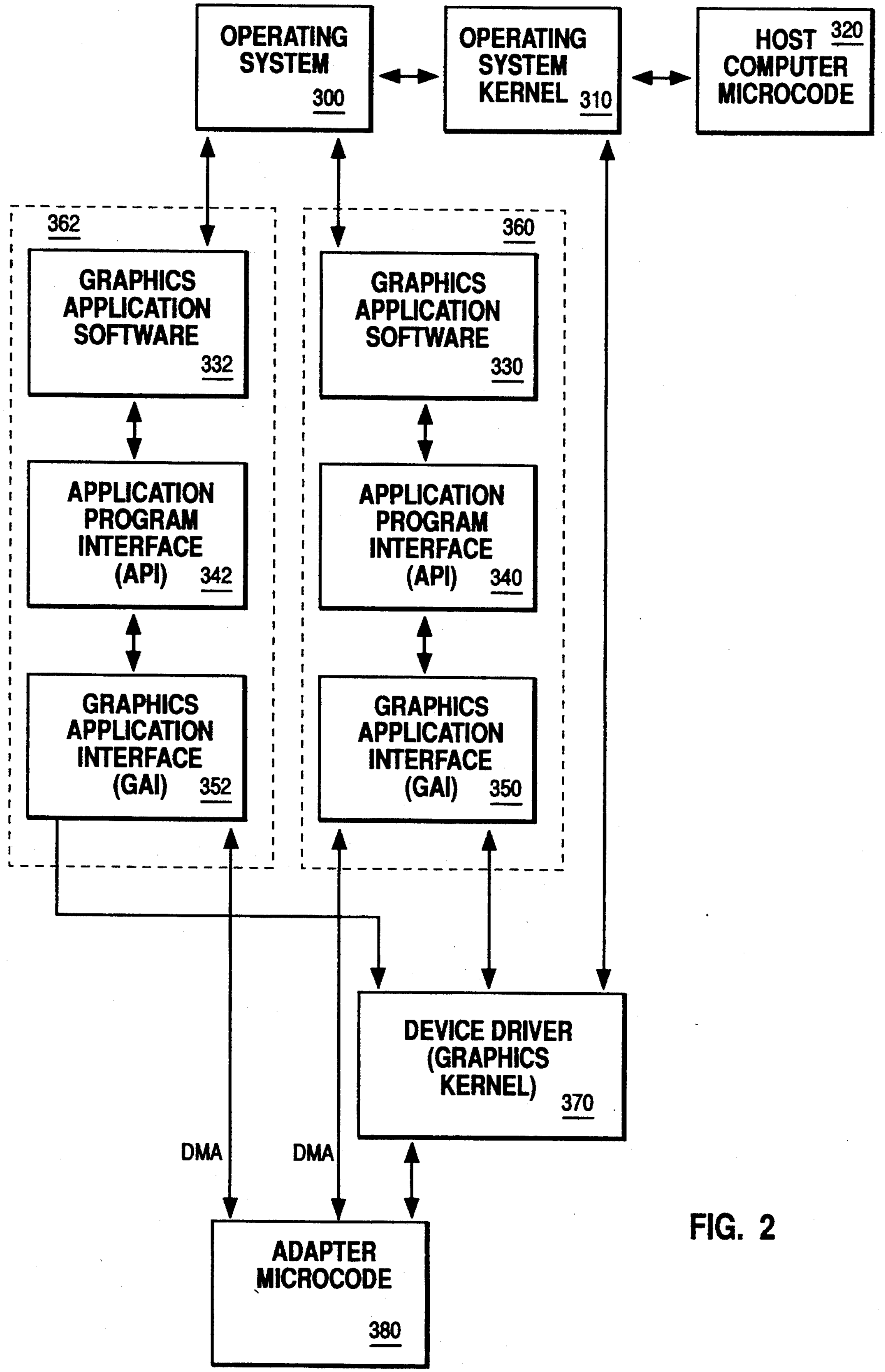
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application. API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are typically considered by the operating system and the device driver to be a single process. That is, graphics applications 330 and 332, API 340 and 342, and GAI 350 and 352 are considered by operating system 300 and device driver 370 to be processes 360 and 362, respectively. The processes are typically identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–342 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window. The adapter microcode then breaks each remaining drawing primitive into visible pixels from the perspective given by the user. In dynamic LUT systems, color indexes are then calculated for the image to be displayed. The color indexes are then loaded into the frame buffer and the actual color values are loaded into the LUT. In the case of a three dimensional model, a depth buffer is often used to store the depth of each displayed pixel. This step of calculating color indexes is very computationally intensive due to the number of pixels and colors involved.

In the preferred embodiment, the color palette or LUT generation technique could be utilized in the adapter microcode which is close to the adapter frame buffer. This approach would also be relatively quick and fairly easy to implement. In an alternative embodiment, the color palette or LUT generating technique will be utilized in hardware in the graphics adapter processor. This approach is extremely quick but would probably necessitate specialized hardware. This would allow for rapid generation of a color palette or LUT for images displayed by the graphics adapter. In other alternative embodiments, the color palette or LUT generation technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. As would be obvious to one of ordinary skill in the art, the present technique would be applied in many other locations within the host computer or graphics adapter.

Figure 3:
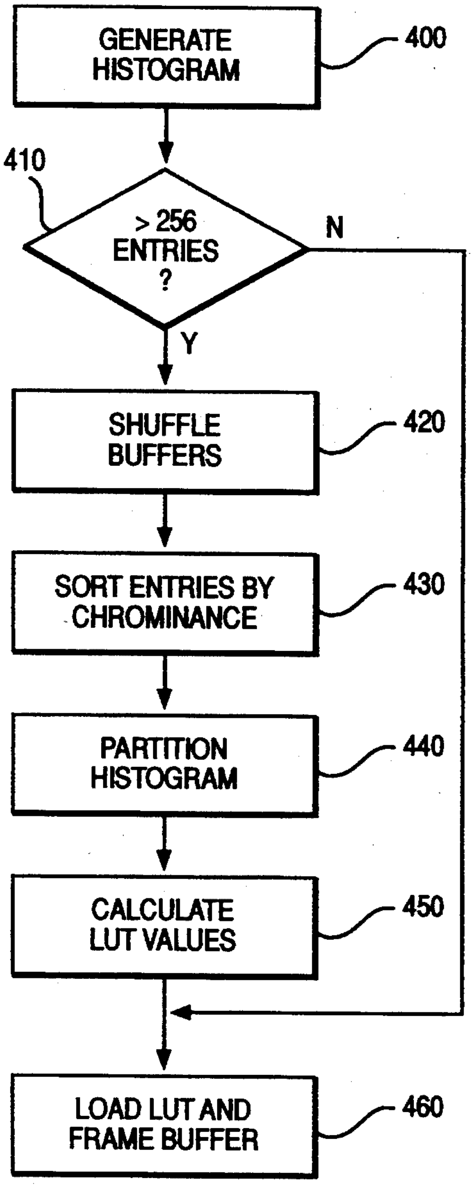
FIG. 3 is a flowchart illustrating a preferred method for generating a LUT for a given image.

FIG. 3 is a flowchart illustrating a preferred method for generating a color palette or LUT for a given image. For illustrative purposes, the present invention is described utilizing a 24 bit RGB color system (8 bits each for red, green, and blue color component) with an 8 bit frame buffer, a 256 color video LUT, and a 1280×1024 display (over 1.2 million pixels). However, tile present invention may also be used in alternative embodiments with other color systems such as HSV (hue saturation value color components) and HLS (hue lightness saturation color components) color systems.

In a first step 400, a histogram is generated from the pixel image data and is stored in memory. An example of such a histogram is shown in FIG. 4A. The histogram lists, in each entry called an element, each of the pixel color components in the image with a total of the number of times that pixel color is given in the image. In addition, a tentative LUT index is assigned to each histogram entry. Utilizing a histogram compresses the number of pixels to be handled by this technique, although it is not required. In the preferred embodiment, the histogram contains complete pixel color data (e.g. 24 bits). In alternative embodiments, the number of bits of data stored could be less than the number of bits used to describe color. For example, in a 24 bit RGB color system, the most significant 6 bits of each color component (red, green or blue) could be used to provide a table with three 6 bit color components. Although this approach could speed the LUT generation process, it would likely result in a less photorealistic image.

In step 410, the number of different pixel colors in the image, as described by the histogram, is compared to the number of entries in the LUT (256 in the present example). If the number of different colors is less than or equal to the number of table entries, then steps 420–450 may be omitted and processing would continue to step 460. In step 460, the frame buffer and the LUT are then loaded with the already assigned LUT indexes and actual color component values from the histogram. If the total number of different colors in the image is greater than the number of entries in the LUT, then processing continues to step 420.

In step 420, the description of each of the color component entries in the histogram is shuffled as shown in FIG. 4B. For example, each color description prior to shuffling is as follows:

($R_1R_2R_3R_4R_5R_6R_7R_8$ $G_1G_2G_3G_4G_5G_6G_7G_8$ $B_1B_2B_3B_4B_5B_6B_7B_8$).

After shuffling, each color description is as follows:

($R_1G_1B_1$ $R_2G_2B_2$ $R_3G_3B_3$ $R_4G_4B_4$ $R_5G_5B_5$ $R_6G_6B_6$ $R_7G_7B_7$ $R_8G_8B_8$).

As a result of this shuffling, all of the color information is retained but is in a better format for sorting according to the present invention. In alternative embodiments, the color information may not be shuffled. However, that approach would greatly complicate the following procedures as will be seen below. The shuffled histogram also contains address pointers to the original histogram entries which will be needed later to associate the final LUT entries to the original real pixels.

In step 430, the histogram is sorted by the new color description. FIG. 4C gives an example of a sorted histogram. This results in a very quick sorting of the image by approximate proximity in the color space. That is, a dim red color such as (000 000 000 000 000 100 000 000)

is very close in color space to a dim red with a touch of blue such as (000 000 000 000 000 100 000 001)

which is next to it in the sorted histogram. However, the dim red (000 000 000 000 000 100 000 000)

is not very close in color space to a dimmer red, dim green and dim blue (000 000 000 000 000 011 111 111)

which is also next to it in the sorted histogram. Therefore, this is an approximation of proximity in color space but is not exact. However, this technique has the advantage of being extremely fast compared to other known proximity calculation techniques.

Once shuffled and sorted, the histogram is partitioned in step 440 into up to 256 different groups or nodes, in the present example, for generating the LUT entries. The preferred method of partitioning will be explained in more detail below with reference to FIG. 5.

In step 450, the LUT entries and LUT indexes are generated by calculating the weighted average of all color entries in each group or node. In alternative embodiments, other types of averages may be calculated, such as the median or a non-weighted average, to increase speed. In step 460, the calculated color values are stored in the LUT. By using the address pointers in the sorted and shuffled histogram (see FIG. 4C), the new LUT indexes are stored in the original histogram and are used for storing the appropriate LUT index in the frame buffer for each pixel.

Figure 5:
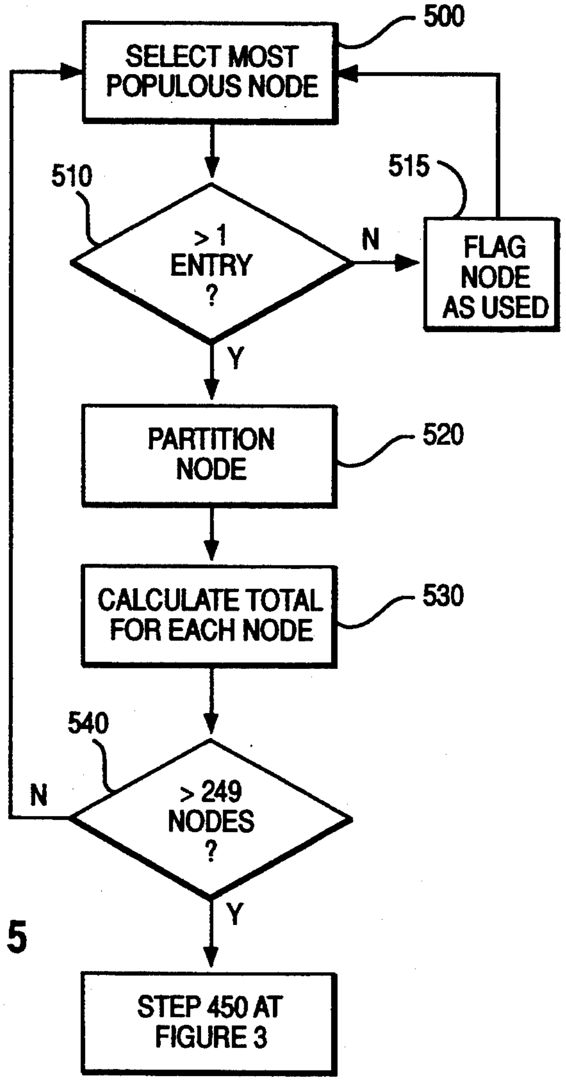
FIG. 5 is a flowchart illustrating a preferred method for partitioning the shuffled and sorted histogram into nodes or groups.

FIG. 5 is a flowchart illustrating a preferred method of partitioning the shuffled and sorted histogram into groups or nodes (up to 256 nodes in the present example). In the preferred embodiment, this partitioning is accomplished by utilizing an octree approach, although a binary tree approach may be used. Before partitioning, there is a single node with more than 256 color entries and a total number of over 1.2 million pixels among those entries. In step 500, the most populous terminal node is selected (which is the only node during the first iteration of this technique). In step 510, it is determined whether this node contains more than one color entry (which is true in the first iteration of the present example). If no, then in step 515, the selected node is flagged as being used and processing returns to step 500 to select the next most populous terminal node. This is to handle nodes that may have only one entry and may not be partitioned.

Figure 6A:
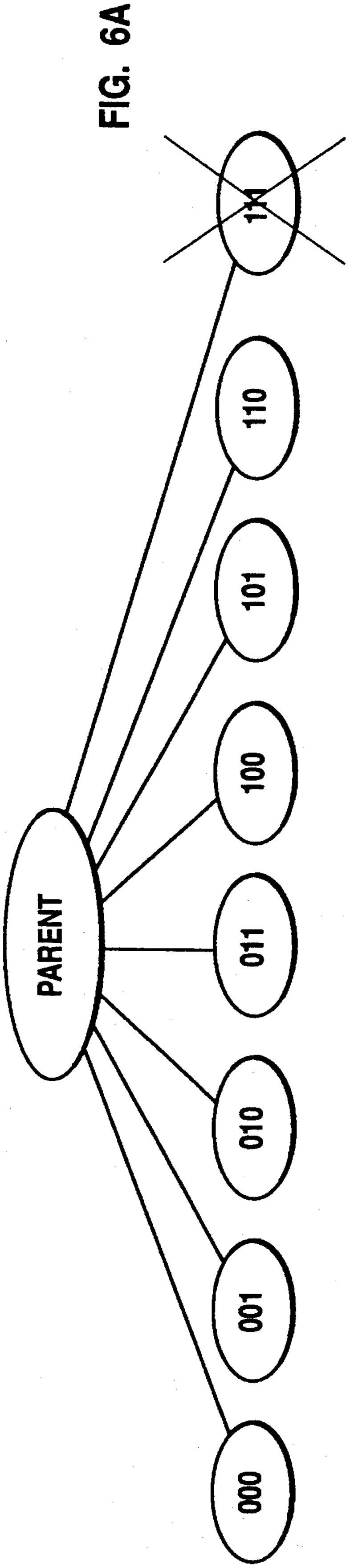
FIGS. 6A–B are diagrams illustrating an octree generated by the preferred method of FIG. 5.

In step 520, the node is partitioned into up to eight terminal nodes as shown in FIG. 6A. by using the leftmost three bits in the histogram. In step 530, the total number of pixels for each of the new terminal nodes is calculated. If a terminal node has no entries (e.g. for node 111 there are no pixels with a leftmost red, green, and blue digit of 1), then it is eliminated as a terminal node. In step 530, it is determined whether the total number of terminal nodes is greater than 249. If yes, then processing continues to step 450 of FIG. 3. If no, then processing returns to step 500. 249 is used for comparison because if there are 249 or less terminal nodes, then the next cycle of this process will result in 256 or less terminal nodes which is less than the number of entries in the LUT. In alternative embodiments, the number could be greater than the number of entries in the LUT (256 in the present example) but then the last partitioning cycle would need to be ignored.

Figure 6B:
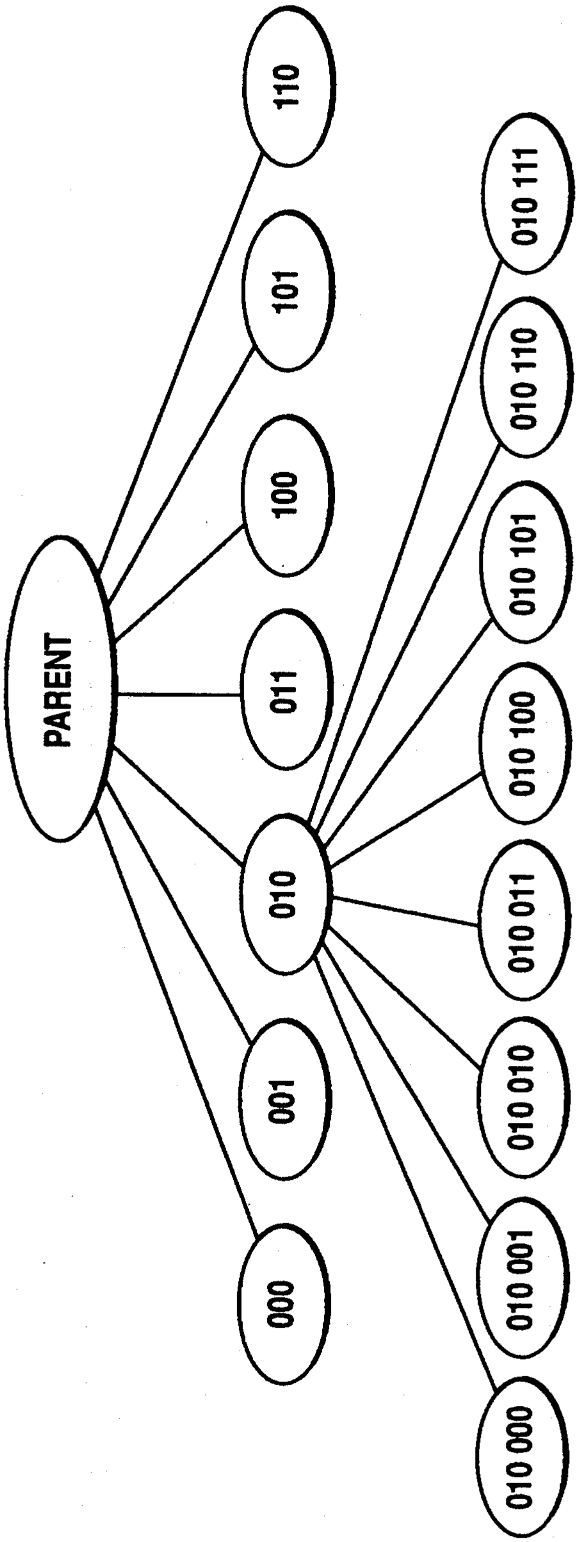

In the next partitioning cycle, the most populous terminal node would then be partitioned. For example, if node 010 were the most populous and contained more than one entry, it would be partitioned into up to eight terminal nodes as shown in FIG. 6B. A terminal node table such as shown in FIG. 7 may be used to track the terminal nodes and their total number of entries. Note that the terminal node table includes the starting address for the entries in the sorted histogram that the terminal node is associated with.

This process continues until the partitioning of the histogram is completed. In alternative embodiments, other partitioning techniques may be utilized. Processing then continues to step 450 of FIG. 3 for loading the LUT and the frame buffer. In step 450, by using the address pointers in the terminal node table to the sorted histogram table and the address pointers from the sorted histogram table to the original histogram table, the original histogram table LUT indexes are loaded with new LUT indexes that result from this process. The frame buffer is then loaded with the appropriate LUT indexes now stored in the original histogram.

Appendix A is a pseudocode program written using a UNIX X Windows environment for generating a LUT using the techniques described above.

Although the present invention has been fully described above with reference to specific embodiments, other alternative embodiments will be apparent to those of ordinary skill in the art. For example, this technique could also be utilized for developing a separate LUT for each window in a dynamic multi-LUT windowing system. Therefore, the above description should not be taken as limiting the scope of the present invention which is defined by the appended claims.

APPENDIX A (C) Copyright International Business Machines Corporation, 1992
All Rights Reserved

```
define structure (
  struct pixel ptr sort_pix
  int use_count
  int index
  I_NODE node                                    /* sort-algorithm node */
)index_entry

define structure (
  index_entry ptr sort_idx
  unsigned int shuffle_pix
  I_NODE node                                    /* sort-algorithm node */
)shuffle_entry

define structure octree_entry (
  index_entry ptr sort_idx
  unsigned int shuffle_pix
)

define structure octree_cell (
  structure octree_entry ptr cell_list
  int cell_list_len
  structure octree_cell ptr ptr sub_cell_list
  int cell_usage
  unsigned int level_mask
  unsigned int level
  unsigned long lut_index
  I_NODE node                                    /* sort-algorithm node */
)

structure octree_cell ptr octree_top
int cells_used

create_lut()
(
                 /* initialise a table to store unique colors    */
  Icreate(ref index_node,0,0)
                 /* initialise a pointer to that table           */
  Icursor(cursor_p,ref index_node,af)
  j := 0
  for (i := 0; i lt nr_pixels; inc i) (
    r_handle := Isearch(cursor_p,ref image[i],3)
    if (r_handle)
      inc (((index_entry ptr)r_handle) pointingto use_count)
    else (
      if (!index_avail) (
```

```
      index_p := (index_entry ptr)getstorage(256*sizeof(index_entry))
      index_avail := 255
    )
    else (
      inc index_p
      dec index_avail
    )
    index_p pointingto sort_pix := ref image[i]
    index_p pointingto use_count := 1
    index_p pointingto index := inc j
                                    /* insert the color into the table */
     r_count :=
       Iinsert(cursor_p,index_p pointingto sort_pix,3,
               (HANDLE)index_p,ref index_p pointingto node,0)
  )
)

if (r_count le LUT_ETYS) (
                                    /* start at the top of the table... */
  j := Icursor(cursor_p,0,0)
  r_handle := Ilower(cursor_p)
  for (j := 0; j lt r_count; inc j) (
    index_p := (index_entry ptr)cursor.handle
    samp_pix := index_p pointingto sort_pix
    rv := (int)samp_pix pointingto red
    gv := (int)samp_pix pointingto green
    bv := (int)samp_pix pointingto blue
    colors[j].red   := re_gamma[rv land 0x000000ff] lshift 8
    colors[j].green := re_gamma[gv land 0x000000ff] lshift 8
    colors[j].blue  := re_gamma[bv land 0x000000ff] lshift 8
    colors[j].pixel := index_p pointingto index
    colors[j].flags := allcolors
                                            /* then get next color */
    r_handle := Ilower(cursor_p)
  )
                                            /* load the X colormap */
  XStoreColors(dpy,cmap,colors,r_count)
  nr_lut_etys := r_count
)
else (
                                      /* initialise the shuffle table */
  Icreate(ref shuffle_node,0,0)
  Icursor(s_cursor_p,ref shuffle_node,bf)
  shuffle_p := shuffle :=
      (shuffle_entry ptr)getstorage(r_count,sizeof(shuffle_entry))
                         /* start at the top of the unique-color table  */
  j := Icursor(cursor_p,0,0)
  Ilower(cursor_p)
  max_shuffle := 0
  while(dec r_count) (
    index_p := (index_entry ptr)cursor.handle
    samp_pix := index_p pointingto sort_pix
    rv := (int)samp_pix pointingto red
    gv := (int)samp_pix pointingto green
    bv := (int)samp_pix pointingto blue
    shuffle_pix := 0
    ptr_val := 0x00000100
    for (i := 0; i lt 8; inc i) (
      if (bv land 1) shuffle_pix := shuffle_pix lor ptr_val
      ptr_val := ptr_val lshift 1
      bv := bv rshift 1
      if (gv land 1) shuffle_pix := shuffle_pix lor ptr_val
      ptr_val := ptr_val lshift 1
      gv := gv rshift 1
      if (rv land 1) shuffle_pix := shuffle_pix lor ptr_val
      ptr_val := ptr_val lshift 1
      rv := rv rshift 1
    )
```

```
      if (shuffle_pix gt max_shuffle) max_shuffle := shuffle_pix
      shuffle_p pointingto sort_idx := index_p
      shuffle_p pointingto shuffle_pix := shuffle_pix
                                        /* and insert it into the table */
      s_count :=
        Iinsert(s_cursor_p,ref shuffle_p pointingto shuffle_pix,3,
                (HANDLE)shuffle_p,ref shuffle_p pointingto node,0)
      inc shuffle_p
      Ilower(cursor_p)
    )

    octree_p := octree_list :=
                (structure octree_entry ptr)
                  getstorage(s_count,sizeof(structure octree_entry))
                                            /* find the biggest shuffle */
    r_handle := Isearch(s_cursor_p,ref max_shuffle,3)
    shuffle_p := (shuffle_entry ptr)r_handle
    octree_size := 0
    i := 0
    while(dec s_count) (
      index_p := shuffle_p pointingto sort_idx
      i := i + index_p pointingto use_count
      octree_p pointingto sort_idx := index_p
      octree_p pointingto shuffle_pix :=
        shuffle_p pointingto shuffle_pix
      inc octree_p
      inc octree_size
                                              /* get next shuffle entry */
      r_handle := Ilower(s_cursor_p)
      shuffle_p := (shuffle_entry ptr)r_handle
    )
    divide_octree(i,octree_size,octree_list)
  )
  if (shuffle) free(shuffle)
  if (octree_list) free(octree_list)
  for (j := 0; j lt nr_pixels; inc j) (
                                               /* look up each color... */
    r_handle := Isearch(cursor_p,ref image[j],3)
    if (r_handle) p_array[j] :=
      ((index_entry ptr)r_handle) pointingto index
  )
  XPutImage(dpy,pixmap,gc,ximage,0,0,0,0,m_width,m_height)
  XCopyArea(dpy,pixmap,m_id,gc,0,0,m_width,m_height,0,0)
)
divide_octree(init_sum,octree_size,octree_list)
int init_sum
int octree_size
structure octree_entry ptr octree_list
(
  unsigned int lcl_mask,last_cmp,lcl_tmp,lcl_fock
  int lcl_level,lcl_decr
  structure octree_cell ptr octree_p
  structure octree_cell ptr octree_s
  structure octree_cell ptr octree_n
  structure octree_entry ptr octree_e
  structure octree_entry ptr octree_l
  I_CURSOR cursor
  I_CURSOR ptr cursor_p
  I_NODE octree_node
  int i,j,cell_cnt,cell_use

  cursor_p := ref cursor
                                        /* initialise an octree table */
  Icreate(ref octree_node,1,1)
  Icursor(cursor_p,ref octree_node,cf)

  octree_p :=
```

```
      (structure octree_cell ptr)
        getstorage(sizeof(structure octree_cell))
octree_p pointingto cell_list := octree_list
octree_p pointingto cell_list_len := octree_size
octree_p pointingto sub_cell_list := 0
octree_p pointingto cell_usage := init_sum
octree_p pointingto level_mask := 0
octree_p pointingto level := 0
octree_p pointingto lut_index := 0
cells_used := 1
                                  /* insert the cell into the table */
Iinsert(cursor_p,ref octree_p pointingto cell_usage,4,
      (HANDLE)octree_p,ref octree_p pointingto node,
        octree_p pointingto cell_usage)
while (cells_used lt (LUT_ETYS-7)) (
                                /* find the cell with highest usage */
  Imaxent(cursor_p)
  octree_s := (structure octree_cell ptr)cursor.handle
  if (octree_s pointingto cell_list_len gt 1) (
    octree_e := octree_s pointingto cell_list
    lcl_mask := octree_s pointingto level_mask
    if (!lcl_mask) lcl_mask := 0xe0000000
    last_cmp := 0xffffffff
    lcl_level := octree_s pointingto level
    lcl_decr := 0x20000000 rshift (3*lcl_level)
    octree_n := 0
    octree_s pointingto sub_cell_list :=
      (structure octree_cell ptr ptr)
        getstorage(8*sizeof(structure octree_cell ptr))
    clear(ref octree_s pointingto sub_cell_list[0],
          8*sizeof(structure octree_cell ptr))
    for (i := 0; i lt octree_s pointingto cell_list_len; inc i) (
      lcl_tmp := octree_e pointingto shuffle_pix land lcl_mask
      if (compare(ref lcl_tmp,ref last_cmp,4)) (
        if (octree_n) (
          octree_n pointingto cell_list_len := cell_cnt
          octree_n pointingto cell_usage := cell_use
          Iinsert(cursor_p,ref octree_n pointingto cell_usage,4,
              (HANDLE)octree_n,ref octree_n pointingto node,
                  octree_n pointingto cell_usage)
          inc cells_used
        )
        cell_use := 0
        cell_cnt := 0
        last_cmp := lcl_tmp
        octree_n := (structure octree_cell ptr)
          getstorage(sizeof(structure octree_cell))
        j := last_cmp rshift (29 - 3*lcl_level)
        octree_s pointingto sub_cell_list[j] := octree_n
        octree_n pointingto cell_list := octree_e
        octree_n pointingto cell_list_len := 0
        octree_n pointingto sub_cell_list := 0
        octree_n pointingto level_mask := lcl_mask rshift 3
        octree_n pointingto level := lcl_level+1
      )
      cell_use := cell_use +
        (octree_e pointingto sort_idx) pointingto use_count
      inc octree_e
      inc cell_cnt
    )
    if (octree_n) (
      octree_n pointingto cell_list_len := cell_cnt
      octree_n pointingto cell_usage := cell_use
      Iinsert(cursor_p,ref octree_n pointingto cell_usage,4,
              (HANDLE)octree_n,ref octree_n pointingto node,
              octree_n pointingto cell_usage)
      inc cells_used
```

```
        )
                                        /* relocate the highest usage cell */
        Imaxent(cursor_p)
        Idelete(cursor_p)
        dec cells_used
      )
                                    /* if only one color, ignore it for now */
      else Ichgval(cursor_p,0)
    )
                                                /* point to the octree root */
    j := Icursor(cursor_p,0,0)
    nr_lut_etys := 0
    show_oct(octree_p)
                                                    /* store the colormap */
    XStoreColors(dpy,cmap,colors,nr_lut_etys)
  )
  show_oct(octree_p)
  structure octree_cell * octree_p
  (
    int i
    structure pixel ptr this_pix
    structure octree_entry ptr this_list
    int use_value,use_sum
    int red_sum,green_sum,blue_sum
    int lcl_idx

    if (octree_p pointingto sub_cell_list) (
      for (i := 0; i lt 8; inc i) (
        if (octree_p pointingto sub_cell_list[i])
          show_oct(octree_p pointingto sub_cell_list[i])
      )
    )
    else (
      octree_p pointingto lut_index := lcl_idx := inc nr_lut_etys
      this_list := octree_p pointingto cell_list
      use_sum := 0
      red_sum := 0
      green_sum := 0
      blue_sum := 0
      for (i := 0; i lt octree_p pointingto cell_list_len;
         inc i, inc this_list) (
      this_pix := this_list pointingto sort_idx pointingto sort_pix
      (this_list pointingto sort_idx) pointingto index := lcl_idx
      use_value := (this_list pointingto sort_idx) pointingto use_count
      use_sum := use_sum + use_value
      red_sum := red_sum + use_value*this_pix pointingto red
      green_sum := green_sum + use_value*this_pix pointingto green
      blue_sum := blue_sum + use_value*this_pix pointingto blue
    )
    red_sum := red_sum / use_sum
    green_sum := green_sum / use_sum
    blue_sum := blue_sum / use_sum
    colors[lcl_idx].red :=
      re_gamma[red_sum land 0x000000ff] lshift 8
    colors[lcl_idx].green :=
      re_gamma[green_sum land 0x000000ff] lshift 8
    colors[lcl_idx].blue  :=
      re_gamma[blue_sum land 0x000000ff] lshift 8
    colors[lcl_idx].pixel := lcl_idx
    colors[lcl_idx].flags := allcolors
  )
)

void
af(cursor)
I_CURSOR ptr cursor
(
```

```
  index_entry ptr ip

  ip := (index_entry ptr)cursor pointingto handle
  cursor pointingto key := (char ptr)(ip pointingto sort_pix)
  cursor pointingto key_len := 3
)

void
bf(cursor)
I_CURSOR ptr cursor
(
  shuffle_entry ptr ip

  ip := (shuffle_entry ptr)cursor pointingto handle
  cursor pointingto key := (char ptr)(ref ip pointingto shuffle_pix)
  cursor pointingto key_len := 3
)

void
cf(cursor)
I_CURSOR ptr cursor
(
  structure octree_cell ptr ip

  ip := (structure octree_cell ptr)cursor pointingto handle
  cursor pointingto key := (char ptr)(ref ip pointingto cell_usage)
  cursor pointingto key_len := 4
)
```

What is claimed is:

1. A method for generating a color palette from elements having multiple color component values comprising the steps of:

a) determining a color proximity of said elements according to a most significant bit of each element color component value followed by less significant bits of each element color component value;

b) partitioning said elements into a plurality of groups based on the determined color proximity such that said elements are partitioned according to a most significant bit of each element color component value followed by less significant bits of each element color component value;

c) generating a color palette from said plurality of groups; and d) displaying pixels having colors utilizing said generated color palette, 2. The method of claim 1 further comprising a step of generating element color component values from pixel color component values, each element representing at least one pixel.

3. The method of claim 2 further comprising a step of indexing said plurality of groups of said color palette to said pixels represented by said elements.

4. The method of claim 3 wherein said step of partitioning includes further partitioning said plurality of groups by partitioning a group having elements representing a greatest number of pixels.

5. The method of claim 4 wherein said step of further partitioning includes partitioning the group having elements representing the greatest number of pixels by utilizing octrees.

6. An apparatus for generating a color palette from elements having multiple color component values comprising:

a) means for determining a color proximity of said elements according to a most significant bit of each element color component value followed by less significant bits of each element color component value;

b) means for partitioning said elements into a plurality of groups based on the determined color proximity such that said elements are partitioned according to a most significant bit of each element color component value followed by less significant bits of each element color component value;

c) means for generating a color palette from said plurality of groups; and d) display means for displaying pixels having colors utilizing said generated color palette.

7. The apparatus of claim 6 further comprising means for generating element color component values from pixel color component values, each element representing at least one pixel.

8. The apparatus of claim 7 further comprising means for said plurality of groups of said color palette to said pixels represented by said elements.

9. The apparatus of claim 8 wherein said means for partitioning includes means for further partitioning said plurality of groups by partitioning a group having elements representing a greatest number of pixels.

10. The apparatus of claim 9 wherein said means for further partitioning includes means for partitioning the group having elements representing the greater number of pixels by utilizing octrees.

11. A data processing system for generating a color palette from elements having multiple color component values comprising:

a) a processor for processing data;

b) a memory for storing data for processing;

c) means for determining a color proximity of said elements according to a most significant bit of each element color component value followed by less significant bits of each element color component value;

d) means for partitioning said elements into a plurality of groups based on the determined color proximity such that said elements are partitioned according to a most significant bit of each element color component value followed by less significant bits of each element color component value; p1 e) means for generating a color palette from said plurality of groups; and f) a display for displaying pixels having colors utilizing said generated color palette.

12. The data processing system of claim 11 further comprising means for generating element color component values from pixel color component values, each element representing at least one pixel.

13. The data processing system of claim 12 further comprising means for indexing said plurality of groups of said color palette to said pixels represented by said elements.

14. The data processing system of claim 13 wherein said means for partitioning includes means for further partitioning said plurality of groups by partitioning a group having elements representing a greatest number of pixels.

15. The data processing system of claim 14 wherein said means for further partitioning includes means for partitioning the group having elements representing the greatest number of pixels by utilizing octrees.

16. A method for generating look up table entries from elements having multiple color component values comprising the steps of:

a) sorting said elements according to a most significant bit of each element color component value followed by less significant bits of each said element color component value;

b) partitioning said sorted elements into a plurality of groups based on the color proximity such that said elements are partitioned according to a most significant bit of each element color component value followed by less significant bits of each element color component value;

c) generating look up table entries from said plurality of groups; and d) storing said table entries in a memory means.

17. The method of claim 16 further comprising a step of generating element color component values from pixel color component values, each element representing at least one pixel.

18. The method of claim 17 further comprising a step of indexing said look up table entries to said pixels represented by said elements.

19. The method of claim 18 wherein said step of partitioning includes further partitioning said plurality of groups by partitioning a group having elements representing a greatest number of pixels.

20. The method of claim 19 wherein said step of further partitioning includes partitioning the group having elements representing the greatest number of pixels by utilizing octrees.

* * * * *